United States Patent [19]

Kálal et al.

[11] 4,332,694
[45] Jun. 1, 1982

[54] THREE-DIMENSIONAL CARRIER OF INORGANIC POROUS MATERIAL-REACTIVE POLYMER AND A METHOD FOR ITS PREPARATION

[75] Inventors: Jaroslav Kálal; Marie Tlustáková, both of Prague, Czechoslovakia

[73] Assignee: Ceskoslovenska akademie ved, Prague, Czechoslovakia

[21] Appl. No.: 98,343

[22] Filed: Nov. 29, 1979

Related U.S. Application Data

[63] Continuation-in-part of Ser. No. 847,259, Oct. 31, 1977, abandoned.

[30] Foreign Application Priority Data

Nov. 12, 1976 [CS] Czechoslovakia ............... 7319-76
Nov. 12, 1976 [CS] Czechoslovakia ............... 7320-76

[51] Int. Cl.$^3$ ............... C12N 11/08; B32B 17/10
[52] U.S. Cl. ............... 252/189; 427/386; 428/403; 428/404; 428/407; 428/417; 435/180
[58] Field of Search ............... 252/189; 427/386; 428/304, 403, 404, 407, 417; 435/180

[56] References Cited

U.S. PATENT DOCUMENTS 2,956,613 10/1960 Edelman et al. ............... 427/386
3,850,661 11/1974 Dreher et al. ............... 427/386
3,935,339 1/1976 Cooke ............... 427/386
4,112,185 9/1978 Meiller ............... 428/403

Primary Examiner—Irwin Gluck

[57] ABSTRACT

The invention relates to three-dimensional carriers consisting of inorganic porous material and 0.001–95% of unextractably sorbed reactive polymer of the general formula I:

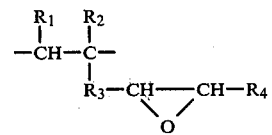

where $R_1$, $R_2$, $R_4$ respectively are hydrogen atom, alkyl with 1–5 carbon atoms, or aryl, and $R_3$ is the group —COO—$(CH_2)_n$—, and to a method for its preparation. The three-dimensional carriers may be prepared by coating the inorganic porous material with a monomer, which is left to polymerize under the conditions of solution polymerization, while the soluble polymer, which is not bound on the surface of the inorganic material, is removed by extraction.

The three-dimensional carrier may also be prepared by depositing a solution of a polymer of general formula I and with a degree of polymerization lower than $10^3$ on the inorganic porous material, leaving the two materials in contact with each other, and separating the unbound polymer by extraction.

The carriers of inorganic porous material-reactive polymer combine good properties of the inorganic material with the high reactivity of the polymeric coating. An advantage of the carrier is not only the combining of inorganic porous materials with a polymer containing epoxy groups, but also an ample opportunity of modifying the carrier by chemical reactions of the epoxy group. This opportunity may be employed in bonding biologically active compounds, dyes, complex-forming compounds and other low-molecular and high-molecular weight compounds to the carrier.

8 Claims, No Drawings

THREE-DIMENSIONAL CARRIER OF INORGANIC POROUS MATERIAL-REACTIVE POLYMER AND A METHOD FOR ITS PREPARATION

RELATED APPLICATION

This application is a continuation-in-part of Ser. No. 847,259, filed Oct. 31, 1977, now abandoned.

The invention relates to a carrier consisting of inorganic porous material and, unextractably sorbed thereto, a variable amount of polymer containing in the polymeric molecule epoxy groups, and to a method for its preparation. The form of the system is completely dependent on the form in which the inorganic material used is present.

At present, the reactivity of the epoxy groups of monomers is made use of mainly in the preparation of insoluble resins, when an inorganic material, glass fibers in this case, is incorporated in the polymeric network under comparatively exacting polymerization conditions and with addition of another monomer or cross-linking agent. Monomers containing epoxy groups are in this case some kind of "binding" compound for the material formed, which consequently is completely inactive.

The use of inorganic materials as carriers is restricted by the low reactivity of the inorganic surface. Activations carried out with aminoalkylsilanes remove this disadvantage. Free amino groups of aminoalkylsilane can then be employed in bonding active compounds, which however reduces the possibilities of bonding only to known reactions of the amino group. Such procedure of activation of the surface of inorganic materials does not lead to any improvement in the stability of inorganic materials in certain pH regions.

The carriers of inorganic porous material-reactive polymer combine good properties of the inorganic material with the high reactivity of the polymeric coating. Advantages of such carriers consist in their high mechanical stability, shape variability, noncompressibility within a wide range of hydrostatic pressures, abrasion resistance, resistance against microorganisms, shape stability against solvents and temperature, and last but not least stability within a wide range of pH, so that there is no need to use other, more expensive coatings.

The variable porosity of the carrier removes the disadvantage of high diffusion resistivities against mass transfer, which is an obstacle to the use of inorganic materials in reactors.

An undeniable advantage of the carrier according to this invention is not only the combining of inorganic porous materials with a polymer containing epoxy groups, but also an ample possibility of modifying the carrier by chemical reactions of the epoxy group. This may be employed in bonding biologically active compounds, dyes, complex-forming compounds and other low-molecular and high-molecular weight compounds to the carrier.

The invention relates to carriers consisting of inorganic porous material and 0.001–95% of unextractably sorbed reactive polymer of the general formula I:

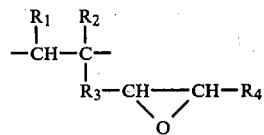

where $R_1$, $R_2$, $R_4$ respectively are hydrogen atom, alkyl with 1–5 carbon atoms, or aryl, and $R_3$ is the group $-COO-(CH_2)_n-$, where n is 1 or 2.

According to the invention, the three-dimensional carriers may be prepared by coating the inorganic porous material with a monomer, which is left to polymerize under the conditions of solution polymerization, while the soluble polymer, which is not bound on the surface of the inorganic material, is removed by extraction.

The three-dimensional carrier may also be prepared according to the invention by depositing a solution of a polymer of general formula I and with a degree of polymerization lower than $10^3$ on the inorganic porous material, leaving the two materials in contact with each other, and separating the unbound polymer by extraction.

Glass, silica gel, and asbestos are advantageously used as the inorganic porous material.

The method for preparation of the said carriers consists in the deposition of the monomer on the inorganic material, at reduced pressure if required. The establishment of sorption equilibrium is probably accompanied by a reaction between the SiOH groups of the surface of the inorganic material and the epoxy groups of the monomer according to the scheme:

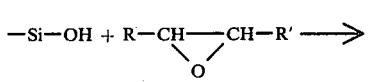

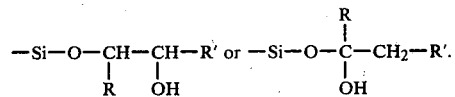

The possibility of formation of such a bond was confirmed by a reaction with 1-chloro-2,3-epoxypropane, 2,2'-bis[4-(2,3-epoxypropyloxy)phenyl]-propane and with 3,4-epoxybut-1-ene, which were bonded on the inorganic material without any possibility of washing them out or removing by drying in vacuo.

If an epoxy group containing a polymerizable double bond is used, such as 4,5-epoxy-pent-1-ene, 3,4-epoxy-pent-1-ene, 5,6-epoxyhex-1-ene, 8,9-epoxynone-1-ene, 1,2-epoxy-3-vinyloxypropane, 1-allyloxy-2,3-epoxypropane, 1-allyloxy-2,3-epoxybutane, 1-allyloxy-3,4-epoxybutane, 1-allyloxy-2,3-epoxy-2-methylpropane, 2,3-epoxypropylester-allylester of carbonic acid, 3,4-epoxybutyl acrylate or crotonate, 2,3-epoxy-2-ethylhexyl acrylate, allyl-9,10-epoxy stearate, 2,3-epoxypropyl sorbate, 2,3-epoxypropyl vinyl phthalate, 2,3-epoxypropyl allyl phthalate or maleate, allyl-4,5-epoxypentanoate, allyl-5,6-epoxyhexanoate and the like, the said double bond may be used in bonding polymeric chains which, with advantage, contain functional groups.

A suspension of porous inorganic material with bonded reaction product of the epoxy group-containing monomer is polymerized after the establishment of sorption equilibrium in order to obtain a suspension of inorganic material in the polymer solution. The whole process can be carried out in one reaction step, without separation of the inorganic porous material with the bonded reaction product of the epoxy group-containing monomer. By using various amounts of solvent in the polymerization, it is possible to obtain various polymer contents bonded to the inorganic material, and thus also various contents of the epoxy groups in the carrier, and eventually various specific surfaces and various pore diameters.

On a three-dimensional porous carrier thus prepared, owing to the high reactivity of the epoxy groups of the polymeric component of the carrier, it is possible to change functional groups according to need by reaction with various reagents. In this way, a three-dimensional carrier is obtained, consisting of an inorganic porous material and 0.001 to 95% of unextractably sorbed reactive polymer of the general formula II:

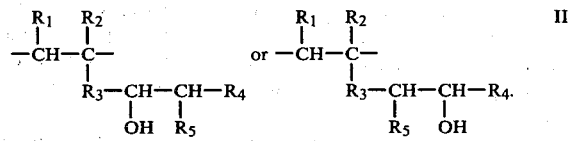

where $R_1$, $R_2$, $R_4$ respectively are hydrogen atom, alkyl with 1–5 carbon atoms, or aryl, $R_3$ is the group $-COO-(CH_2)_n-$, wherein n is 1 or 2, and $R_5$ is amino group, hydroxy group, carbonyl, $-NH-(CH_2)_p-NH_2$, $-NH-(CH_2)_n-N=CH-(CH_2)_m-CHO$, $-NH-$ aryl$-NH_2$, $-NH-$ aryl$-N_2$ Cl, $-NH-(CH_2)_p-NCS$, $-NH-(CH_2)_p-NCO$, $-NH(CH_2)_p-CON_3$, $-NH-C_3H_3$ $Cl_2$, $-O-C_3N_3Cl_2$, $-NH-(CH_2)_p-NH-C_3N_3ClOCH_3$, wherein m is an integer from 1 to 5 and p is an integer from 2 to 6.

Preparation of said carrier according to the invention consists in subjecting a three-dimensional carrier composed of inorganic porous material and of a polymer of the general formula I to treatment with ammonia, amines and diols or phosgene, thiophosgene, diazotization, solutions, compounds which oxidize or isomerize the epoxy group of the polymeric component of the carrier, such as periodic acid and its salts or boron trifluoride etherate, solutions which hydrolyze the epoxy groups, such as dilute acids, esters or hydrazides of amino acids, carbodiimides, substituted sym. triazines. The conditions are such that the epoxy group of the polymeric component of the carrier reacts with one of the foregoing reagents. In this way, it is possible to replace the epoxy group with other reactive groups and to bind biologically active compounds to the carrier through reaction with such other reactive groups.

The bonding of biologically active compounds to a carrier may also be effected by direct reaction between an active compound and the epoxy groups of the carrier with a polymeric component of the general formula I. Here, the polymeric chain to a certain extent plays the role of a "spacer".

The invention is further described in the following examples, which illustrate the procedure, but do not limit its scope. The given contents of the epoxy groups have been calculated as percent of the theoretical content only for the polymeric coating of the inorganic material.

EXAMPLE 1

Onto 100 g of glass microporous crushed material (prepared according to Czechoslovak Pat. No. 130 475), grain size 0.1–0.3 mm, 180 ml of 2,3-epoxypropyl methacrylate was deposited by distillation in a vacuum of 26.66 Pa. The suspension was left to stand at ambient temperature for 100 h and then polymerized after dilution with a solution of 1.5 g $\alpha,\alpha'$-azobisisobutyronitrile in various amounts of dry 1,4-dioxane (cf.Table) at 70° C. for 60 min. On cooling, the glass was separated, washed with a large amount of 1,4-dioxane, and dried.

TABLE

| dilution (per monomer) | 1:2 | 1:4 | 1:8 | 1:12 | 1:16 | 1:30 |
|---|---|---|---|---|---|---|
| % polymer | 19,29 | 16,43 | 12,04 | 10,60 | 8,16 | 5,75 |
| % epoxy groups | 57,3 | 54,5 | 47,3 | 46,2 | 38,5 | |

EXAMPLE 2

Onto 3 g of porous glass CPG-10, 200–400 mesh, with various pore diameters, 10 ml of 2,3-epoxypropyl methacrylate was deposited by distillation in a vacuum of 26.66 Pa. After standing at ambient temperature for 100 h, the suspension of glass in the monomer was diluted with a solution of 0.8 g AIBN in 20 ml 1,4-dioxan and polymerized at 70° C. for 60 min. On cooling, the glass was filtered by suction, washed with a large amount of 1,4-dioxan and dried. The polymer contents in glasses cf. Table.

TABLE

| Glass CPG-10 | | | | | |
|---|---|---|---|---|---|
| specific surface area (m²/g) | 213,4 | 160,4 | 56,9 | | 12,6 |
| pore diameter (Å) | 74,5 | 176 | 493 | 977 | 2023 |
| % polymer | 33,6 | 27,9 | 13,7 | 8,4 | 3,3 |
| % epoxy groups | 60,7 | 58,4 | 55,9 | 53,6 | 49,2 |

EXAMPLE 3

Onto 5 g of silicagel, 10 ml of 2,3-epoxypropyl acrylate was deposited by distillation in a vacuum of 26.66 Pa, and the suspension was left to stand at 10° C. for 72 h. The polymerization was carried out after dilution of the suspension with a solution of 0.075 g AIBN in 50 ml of dried distilled 1,4-dioxan at 70° C. for 20 min. Further treatment as in Example 1, 2. The carrier contains 7.03% of polymer with 47.5% of epoxy groups.

EXAMPLE 4

Onto 2 g of glass microporous crushed material (prepared according to Czechoslovak Pat. No. 132 896), a solution of 1 g of poly(2,3-epoxypropyl methacrylate) in 5 ml of dry 1,4-dioxan was poured. Microporous glass with 1.6% of polymer was obtained after heating the suspension for 50 h, separation, and washing of the sample with 1,4-dioxan.

EXAMPLE 5

Onto 1 g of dry asbestos, 5 ml of 2,3-epoxypropyl methacrylate was deposited by distillation in a vacuum of 29.99 Pa, and the suspension was left at ambient temperature for 80 h. After dilution with a solution of 0.0417 g AIBN in 10 ml of 1,4-dioxan, the suspension was polymerized at 70° C. for 60 min. The suspension was then treated as in Example 1 and contained 3.3% of polymer.

EXAMPLE 6

On 1 g of glasses CPG-10, pore diameter 176 Å and 493 Å. a solution of 2 g of 2,2'-bis/4-2,3-epoxypropyloxyphenyl/propane (resin Epoxy 15) in 5 ml of 1,4-dioxan was deposited. After standing at ambient temperature for 90 h, the glass was filtered by suction and thoroughly washed with 1,4-dioxan and ether. The samples were dried for analysis in a vacuum of 13.33 Pa at 100° C. The respective contents of organic compound on glasses with the pore diameters 176 Å and 493 Å were 0.97% and 0.60%. The contents of the epoxy groups were not ascertained.

EXAMPLE 7

Onto 1 g of glass prepared according to Czechoslovak Pat. No. 130,475 and onto 1 g of glasses CPG-10, pore diameters 176 Å and 493 Å, 6 ml of 3,4-epoxybut-1-ene was deposited in vacuo. After standing at ambient temperature for 100 h, the solid compound was separated and thoroughly washed with 1,4-dioxan, acetone, and ether. On drying for analysis as in the preceding Example, the content of organic compound in the Czechoslovak glass was 10.26% and in CPG-10 glasses 14.17% (glass with the pore diameter 176 Å) and 6.39% (glass with the pore diameter 393 Å).

EXAMPLE 8

Onto 0.5 g of glass, pore diameter 493 Å, with bonded 6.39% of the reaction product of 3,4-epoxybut-1-ene, 2 ml of 2,3-epoxypropyl methacrylate was deposited by distillation in vacuo. After dilution with a solution of 0.015 g AIBN in 5 ml of 1,4-dioxan, the suspension was polymerized in an inert atmosphere at 70° C. for 60 min. The glass was filtered by suction, thoroughly washed with 1,4-dioxan and dried for analysis as in Example 6. The glass thus modified contains 9.77% of polymer, in which the assessed content of epoxy groups was 29.8%.

EXAMPLE 9

Onto 1 g of silicagel, pore diameter 300 Å, 4 ml of 2,3-epoxypropyl crotonate was deposited by distillation at a pressure of 13.33 Pa, and the suspension was left at ambient temperature for 90 h. After dilution with a solution of 0.035 g AIBN in 10 ml of 1,4-dioxan, the mixture was heated to 65° C. and left at this temperature for 50 min. After separation of the solid phase and thorough washing with 1,4-dioxan and benzene and drying for analysis, the carrier was found to contain 11.7% of polymer with 62.4% theor. of epoxy groups.

EXAMPLE 10

Onto 1 g of CPG glass, pore diameter 74.5 Å, 4 ml of 2,3-epoxybutyl acrylate was deposited by distillation at a pressure of 40 Pa. After standing for 120 h at 15° C., the suspension was diluted with a solution of 0.04 g AIBN in 20 ml of 1,4-dioxan and polymerized by heating to 70° C. for 15 min. The amount of polymer ascertained after separation of the solid phase, thorough washing with 1,4-dioxan, and drying for analysis was 12.9%, and the content of epoxy groups was 59.8% theor.

EXAMPLE 11

Onto 1 g of CPG-10 glass, pore diameter 368 Å, 3 ml of 3,4-epoxybutyl methacrylate was deposited by distillation at 20 Pa, and the suspension was left at ambient temperature for 100 h. After dilution with a solution of 0.025 g AIBN in 7 ml of 1,4-dioxan, the suspension was polymerized by heating to 70° C. for 60 min. After separation and washing with 1,4-dioxan and drying for analysis, 15.7% of polymer was ascertained containing 47.7% theor. of epoxy groups.

EXAMPLE 12

1 g of glasses CPG-10 with various pore diameters and various contents of poly-/2,3-epoxypropyl methacrylate/—cf. Table—was placed into a solution of 0.1 g of chymotrypsin in 10 ml of borate buffer, pH 9.0, cooled to 4° C. After standing at 4° C. for 60 h, the glasses were filtered by suction, washed with ca. 1 l of icy water and with icy borate buffer until the activity had disappeared in the filtrate. After washing with icy water to neutral reaction, the activity was determined using N-acetyl-L-tyrosine ethyl ester in a Tris buffer, pH 8.2.

TABLE

| pore diameter of glass /Å/ | amount of polymer /%/ | activity units /min/1 g | | |
|---|---|---|---|---|
| 176 | 27.9 | 707 | 652 | 773 |
| 493 | 12.9 | 639 | 590 | 631 |
| 977 | 9.5 | 320 | 323 | 362 |
| 2023 | 3.4 | 192 | 198 | 265 |

EXAMPLE 13

1 g of silicagel, modified with poly/2,3-epoxypropyl methacrylate/, was treated similarly to glasses in the preceding Example. The activities obtained are given in the Table.

TABLE

| pore diameter of silicagel/Å/ | amount of polymer /%/ | activity units /min/ 1g |
|---|---|---|
| 95 | 21.2 | 477 |
| 300 | 8.6 | 282 |

EXAMPLE 14

Onto 1 g of porous glass or silicagel with bonded poly/2,3-epoxypropyl acrylate/, penicillinacylase was bonded in a phosphate buffer, pH 7.5, by standing at 38° C. for 10 days. After thorough washing of the sample—until the activity in the filtrate had disappeared—activities were measured in a buffer pH 7.5 using benzylpenicillin. The activities obtained, pore diameters of glass or silicagel and the amount of polymer bonded on the inorganic material are given in the Table.

TABLE

| pore diameter /Å/ | amount of polymer /%/ | activity units/min/ 1g |
|---|---|---|
| 176 | 27.9 | 47 |
| 493 | 12.9 | 34 |
| | | CPG - 10 glasses |
| 977 | 9.5 | 33 |
| 2023 | 3.4 | 18 |
| 95 | 21.2 | 38 |
| | | silicagel |
| 300 | 8.5 | 18 |

EXAMPLE 15

Onto 1 g of glasses CPG-10 with bonded poly/2,3-epoxypropyl methacrylate/—pore diameters and amounts of the polymer of Table—cooled to −30° C., liquid ammonia was poured, and the glasses were left to stand in a sealed ampoule at ambient temperature for 15 h. After that, ammonia was evaporated and the glasses were dried for analysis. The nitrogen content in the samples corresponds to a 98% conversion of epoxy groups.

Aminated porous carrier was covered with a 2% aqueous solution of glutaraldehyde and left at ambient temperature for 6 h. After separation of the solid phase, the carrier was washed with water, covered with 2.5 ml of a solution of 0.2 g chymotrypsin in a phosphate buffer pH 7.5, cooled to 4° C. and left to stand 8 h at this temperature. After separation of the solid phase, the samples were washed similarly to example 12. The activity of the bonded enzyme measured similarly to Example 9 was ascertained after lyophilization of the samples.

TABLE

| pore diameter of glass /Å/ | amount of polymer /%/ | activity units /min/1g |
|---|---|---|
| 176 | 28.4 | 448 |
| 493 | 6.1 | 267 |

The activity measured for silicagel with the pore diameter 95 A and with bonded 21.2% of poly/2,3-epoxypropyl methacrylate/after modification described above of the epoxy ring of the polymeric coating was 505 units/min/1 g.

EXAMPLE 16

2 g of CPG-10 glasses, pore diameter 176 Å, with bonded 23.8% of poly/2,3-epoxypropyl methacrylate/were heated with an aqueous solution of 0.8 g of periodic acid/150 ml/to 60° C. for eight hours. The carrier thus modified contains 72% theor. of aldehyde groups onto which enzyme can be bonded by leaving the suspension of the carrier to stand for 12 h in a solution of 0.2 g of chymotrypsin in a phosphate buffer of pH 7.5 cooled to 4° C. After separation of the solid phase and washing of the sample until the activity in the filtrate had disappeared, the porous carrier with bonded enzyme was washed with a 20% solution of saccharose and then lyophilized. Activity/measured as in Example 9/was 552 units/min/1 g.

EXAMPLE 17

1 g of silicagel with bonded 21.2% of poly/2,3-epoxypropyl acrylate/was oxidized with periodic acid similarly to the porous carrier in Example 14.

The porous carrier thus obtained with 59% theor. of aldehyde groups was poured into 4 ml of a phosphate buffer pH 7.2 and mildly evacuated. After that, 0.1 g penicillinacylase was added and the suspension thus obtained was left to stand at room temperature for 120 h. Activity of the sample lyophilized as in Example 14 was measured similarly to Example 11 and amounted to 29 units/min/1 g.

EXAMPLE 18

Onto 1 g of glasses CPG-10—pore diameter and amount of bonded poly/2,3-epoxypropyl methacrylate/are given in the Table—ca. 4 ml of ethyl ester of ε-aminocaproic acid were deposited by distillation in a vacuum of 26.66 Pa. The suspension was heated to 80° C. for 10 h. The solid phase was separated, thoroughly washed with ethanol and acetone. The nitrogen content assessed after drying the sample for analysis corresponds to 94% conversion of the epoxy groups.

The porous carrier thus modified was sealed into an ampoule with 15% aqueous solution of hydrazine hydrate and heated to 70° C. for one hour. After separation and thorough washing of the solid compound, the hydrazide formed on the carrier was proved by means of trinitrobenzenesulphonic acid.

The carrier containing hydrazide groups was covered with 3 ml of 10% hydrochloric acid while cooling to 0° C. The solution was left to stand for 10 min, and a solution of 0.1 g of sodium nitrite in 1 ml water was then added to it, slowly and dropwise and with cooling. The cooled suspension was stirred for half an hour, the carrier was separated, washed while cooling with icy water and mixed into a solution of 0.14 g chymotrypsin in 2 ml of 0.5 M sodium bicarbonate. The suspension cooled to 4° C. was left to stand 3 h with occasional stirring. After that, the solid phase was removed by filtration with suction, washed with icy water and then slowly with a 4° C. 0.5 aqueous solution of sodium chloride buffered to pH 3.4 with citrate buffer until the activity had disappeared in the filtrate. After washing with water to neutral reaction to chloride ions, the activity was ascertained similarly to Example 9.

TABLE

| pore diameter of glasses /Å/ | amount of polymer /%/ | activity units /min/ 1 g |
|---|---|---|
| 176 | 28.4 | 218 |
| 493 | 6.1 | 418 |

EXAMPLE 19

10 g silicagel with the pore diameter 95 Å and with bonded 8.5% poly/2,3-epoxypropyl methacrylate/was covered with a ca. double volume of 0.1 N sulphuric acid and heated in a sealed ampoule to 80° C. for 5 h. After that, the carrier was filtered off by suction, washed to neutral reaction with water and dried at reduced pressure—13.33—at 100° C. for 12 h. The content of organic matter was 8.3%. No epoxy groups could be proved on the carrier thus modified.

EXAMPLE 20

1 g of CPG-10 glass, pore diameter 368 Å, and 15.7% of poly/3,4-epoxybutyl methacrylate/bonded was heated with 5 ml ethylenediamine to 70° C. for 8 h. After separation, washing and drying for analysis, the nitrogen content determined on the glass corresponded to a 79.8% conversion of the epoxy groups.

The porous glass thus modified was heated for 15 h in 10 ml of a 10% solution of thiophosgene in dry chloroform. After filtration by suction and washing with dry chloroform, the glass was freed from the excess chloroform by sucking air on the fritted disc.

The carrier was suspended in a 1% solution of trypsin in 0.05 M carbonate buffer, pH 9.0, cooled to 2° C. After standing at 4° C. for 5 h, the carrier was separated with cooling, washed with an icy carbonate buffer until the activity had disappeared in the filtrate, and then washed again with about one liter of icy water to neutral reaction. The activity of bonded trypsin measured colorimetrically to benzoylarginine-p-nitroanilide in a phosphate buffer at pH 7.8 was 85 units/min/1 g.

EXAMPLE 21

1 g of CPG-10 glass, pore diameter 977 Å, and 9.5% of bonded poly/2,3-epoxypropyl acrylate/ was heated with 5 ml of a 25% solution of 1,6-diaminohexane in 1,4-dioxan to 70° C. for 8 h. After separation and washing of the solid phase, the analysis revealed a 65.2% conversion of the epoxy groups.

The carrier thus modified was suspended into a solution of 0.2 ml triethyl amine and 0.4 g 1,3-dichloro-5-methoxytriazine in 10 ml benzene, and the suspension was heated to 50° C. for 5 h. After separation the carrier was washed with benzene and dried for analysis. The conversion of the amino groups calculated from the chlorine content was 73.1% theor.

EXAMPLE 22

1 g of porous glass CPG-10, pore diameter 2023 Å, with bonded 3.4% poly/2,3-epoxypropyl crotonate/- was sealed at a reduced pressure of 3.3 kPa and with cooling with a 30% 1,4-dioxan solution of p-phenylenediamine, and heated to 60° C. for 12 h. The solid phase was separated, the carrier was thoroughly washed, and dried. The conversion of the epoxy group as revealed by analysis was 27.5%.

Thus, reactivity of the epoxy groups not only makes possible direct bonding of biologically active compounds to a carrier in a simple way, but also allows, by using a suitable modification, adjusting the basic porous carrier to the type of compound to be bonded, so that it is possible to bond onto a carrier with the polymeric component of the general formula I not only trypsin, chymotrypsin, or penicillinacylase, but also proteolytic enzymes, hydralases, amylases, dehydrogenases, kinases, oxidases, deaminases, amidases, including lactate dehydrogenase, creatine, phosphokinase, papain, ribonuclease, alkali phosphatase, amyloglucosidase, dextranase, glucosooxidase, penicillinamidase, -galactosidase, ficin, pepsin, carboxypeptidase, streptokinase, urease, amylase, invertase, glycosidase, maltase, zymase, catalase, pectolase, proteases, tyrosinase, cellulase, carboxylase, pectinase, aldehydase, chloinesterase, cozymase, adenase, et al.

The bonding of a biologically active compound is accomplished by acting upon the three-dimensional carrier with a solution of a biologically active compound.

We claim:

1. A three dimensional carrier consisting of a porous inorganic material and 0.001–95% unextractably sorbed reactive polymer of the general formula I,

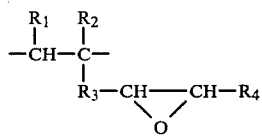

wherein $R_1$, $R_2$, $R_4$ respectively are hydrogen, alkyl with 1–5 carbon atoms, or aryl, and $R_3$ is the group $-COO(CH_2)_n-$, wherein n is 1 or 2, some of the epoxy groups of said polymer having interacted with the surface of said inorganic material, the remaining non-interacted epoxy groups of said polymer representing reactable sites, and said polymer prior to contacting said inorganic material, having a degree of polymerization lower than $10^3$.

2. A three dimensional porous carrier consisting of a porous inorganic material and 0.001–95% unextractably sorbed polymer of the general formula II

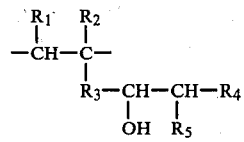

where $R_1$, $R_2$, $R_4$ respectively are hydrogen, alkyl with 1–5 carbon atoms, or aryl, $R_3$ is the group $-COO-(CH_2)_n-$, wherein n is 1 or 2, and $R_5$ is amino group, hydroxyl, carbonyl, $-NH-(CH_2)_p-NH_2$, $-NH-(CH_2)_n-N=CH-(CH_2)_m-CHO$, $-NH-aryl-NH_2$, $-NH-aryl-N_2Cl$, $-NH-(CH_2)_p-NCS$, $-NH-(CH_2)_p-NCO$, $-NH(CH_2)_p CON_3$, $-NH-C_3H_3Cl_2$, $-O-C_3N_3Cl_2$, $-NH-(CH_2)_p-NH-C_3N_3ClOCH_3$, wherein m is an integer from 1 to 5 and p is an integer from 2 to 6, some of the epoxy groups of said reactive polymer of claim 1 having interacted with the surface of said inorganic material.

3. A three dimensional carrier as claimed in claims 1 or 2, wherein the inorganic material is selected from the group consisting of glass, silica gel and asbestos.

4. Method for producing a three-dimensional porous carrier as claimed in claim 1, wherein an inorganic porous material is coated with a monomer, which is left to polymerize under the conditions of solution polymerization, and the soluble polymer not bonded onto the surface of said inorganic material is removed by extraction.

5. Method for producing a three-dimensional porous carrier as claimed in claim 1, wherein the inorganic porous material is coated with a solution of polymer of the general formula I and with the polymerization degree lower than $10^3$, the two are left in contact, and the polymer not bonded to the carrier is separated by extraction.

6. Method for producing a three-dimensional porous carrier consisting of a porous inorganic material and 0.001–95% unextractably sorbed polymer of the general formula II

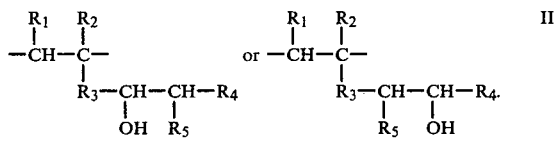

where $R_1$, $R_2$, $R_4$ respectively are hydrogen, alkyl with 1–5 carbon atoms, or aryl, $R_3$ is the group $-COO-(CH_2)_n-$, wherein n is 1 or 2, and $R_5$ is amino group, hydroxyl, carbonyl, $-NH-(CH_2)_p-NH_2$, $-NH-(CH_2)_n-N=CH-(CH_2)_m-CHO$, $-NH-aryl-NH_2$, $-NH-aryl-N_2Cl$, $-NH-(CH_2)_p-NCS$, $-NH-(CH_2)_p-NCO$, $-NH(CH_2)_p CON_3$, $-NH-C_3H_3Cl_2$, $-O-C_3N_3Cl_2$, $-NH-(CH_2)_p-NH-C_3N_3ClOCH_3$, wherein m is an integer from 1 to 5 and p is an integer from 2 to 6, wherein the three-dimensional porous carrier as claimed in claim 1 is treated with ammonia, amine and diols or with phosgene, thiophosgene, diazotization solutions, periodic acid and its salts, boron trifluoride etherate, dilute solutions of acids, esters, or hydrazides of amino acids, carbodiimides, substituted sym. triazines.

7. Method as claimed in claims 4 or 6, wherein the monomer or the reagent is deposited at reduced pressure.

8. A three dimensional carrier consisting of a porous inorganic material and 0.001–95% unextractably sorbed reactive polymer of the general formula I,

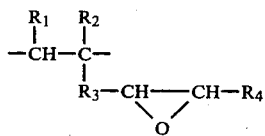

wherein $R_1$, $R_2$, $R_4$ respectively are hydrogen, alkyl with 1–5 carbon atoms, or aryl, and $R_3$ is the group $-COO(CH_2)_n-$, wherein n is 1 or 2, some of the epoxy groups of said polymer having interacted with the surface of said inorganic material, the remaining non-interacted epoxy groups of said polymer representing reactable sites, said polymer prior to contacting said inorganic material, having a degree of polymerization lower than $10^3$, and said polymer having been prepared by polymerization of a monomer selected from the group consisting of 3,4-epoxybut-1-ene, 4,5-epoxy-pent-1-ene, 3,4-epoxypent-1-ene, 5,6-epoxyhex-1-ene, 8,9-epoxynone-1-ene, 1,2-epoxy-3-vinyloxypropane, 1-allyloxy-2,3-epoxypropane, 1-allyloxy-2,3-epoxybutane, 1-allyloxy-3,4-epoxybutane, 1-allyloxy-2,3-epoxy-2-methylpropane, 2,3-epoxypropylester- allylester of carbonic acid, 2,3-epoxypropyl methacrylate, 2,3-epoxypropyl acrylate, 2,3-epoxybutyl acrylate, 2,3-epoxypropyl crotonate, 3,4-epoxybutyl methacrylate, acrylate and crotonate, 2,3-epoxy-2-ethylhexyl acrylate, allyl-9,10-epoxy stearate, 2,3-epoxypropyl sorbate, 2,3-epoxypropyl vinyl phthalate, 2,3-epoxypropyl allyl phthalate or maleate, allyl-4,5-epoxypentanoate and allyl-5,6-epoxyhexanoate.

* * * * *